Figure 1:
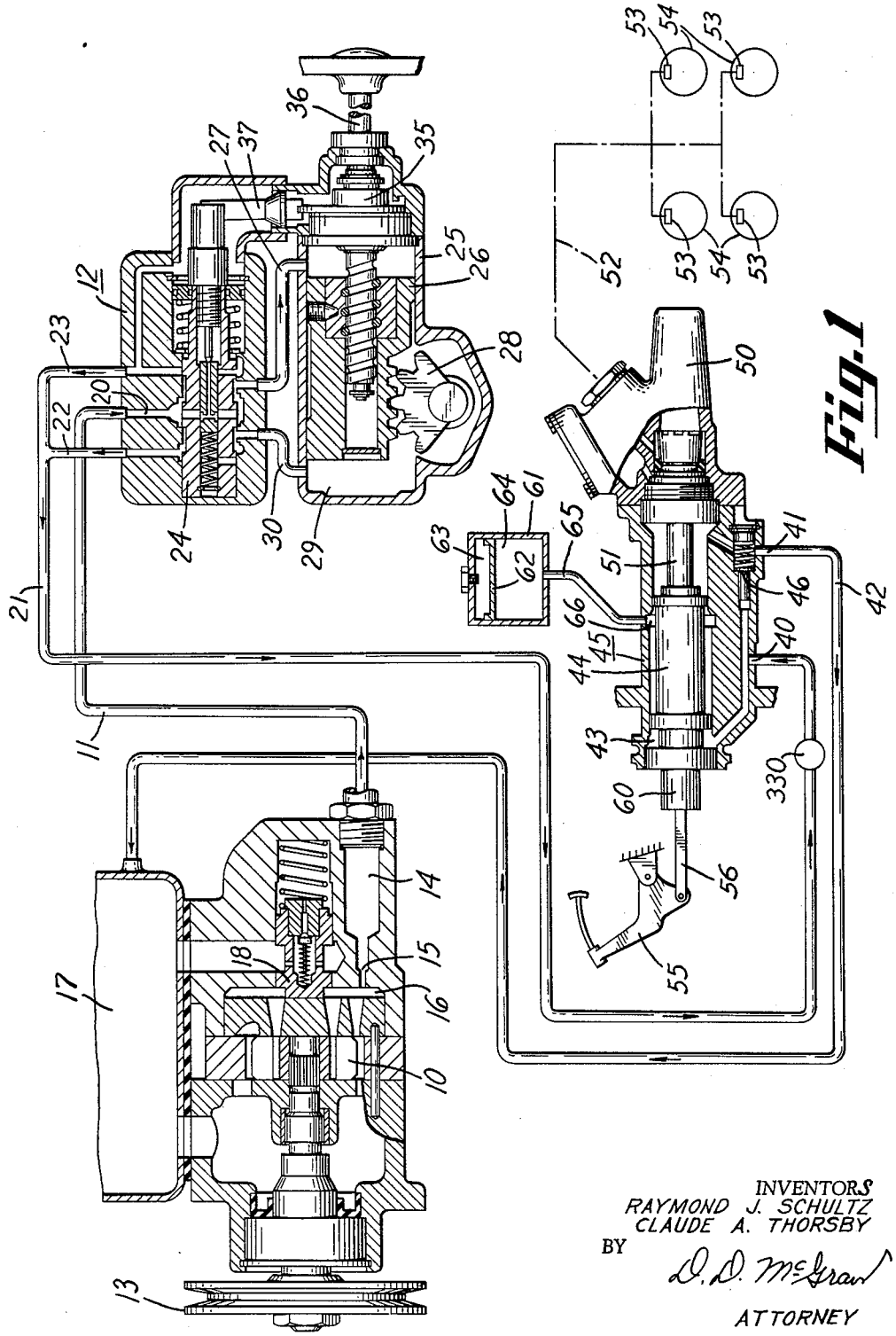

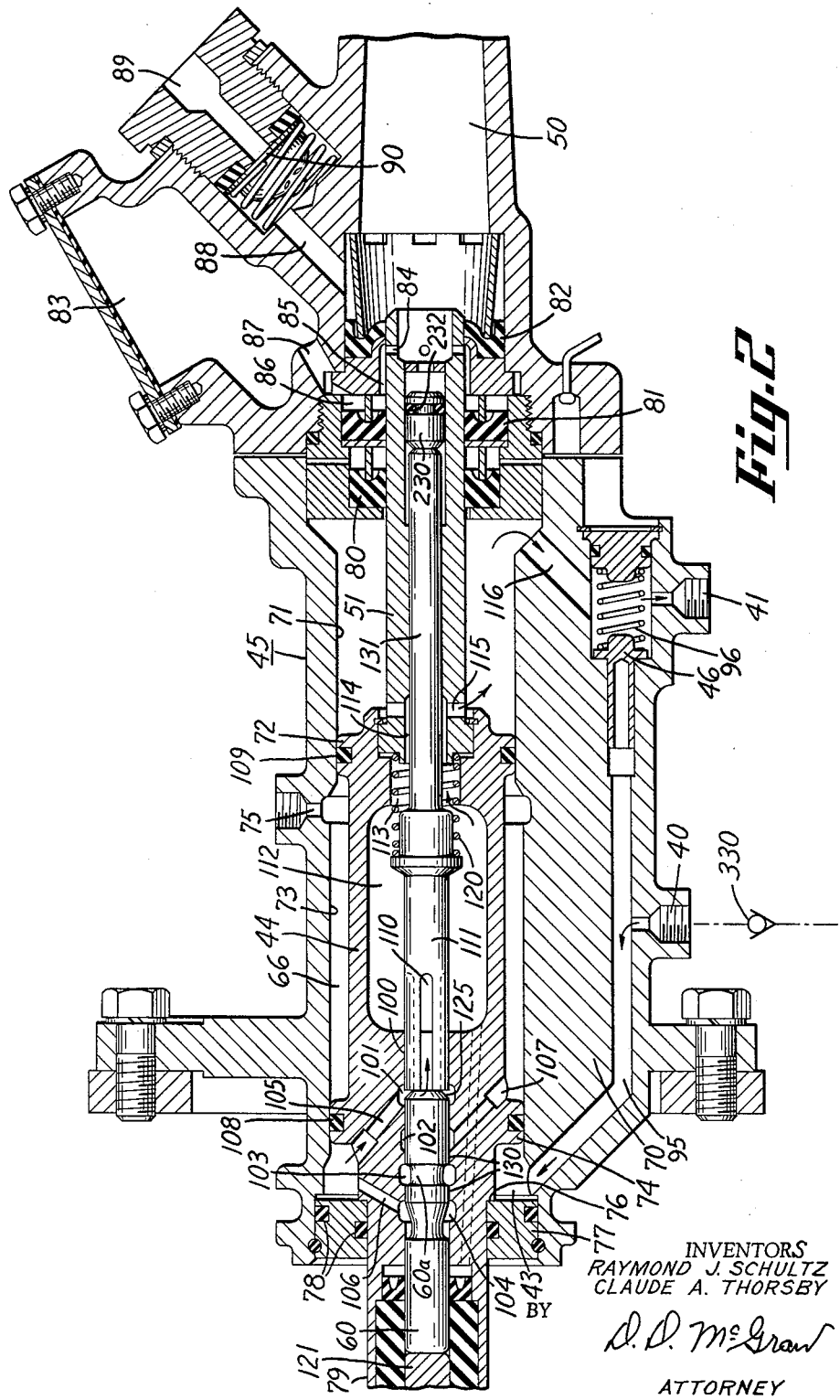

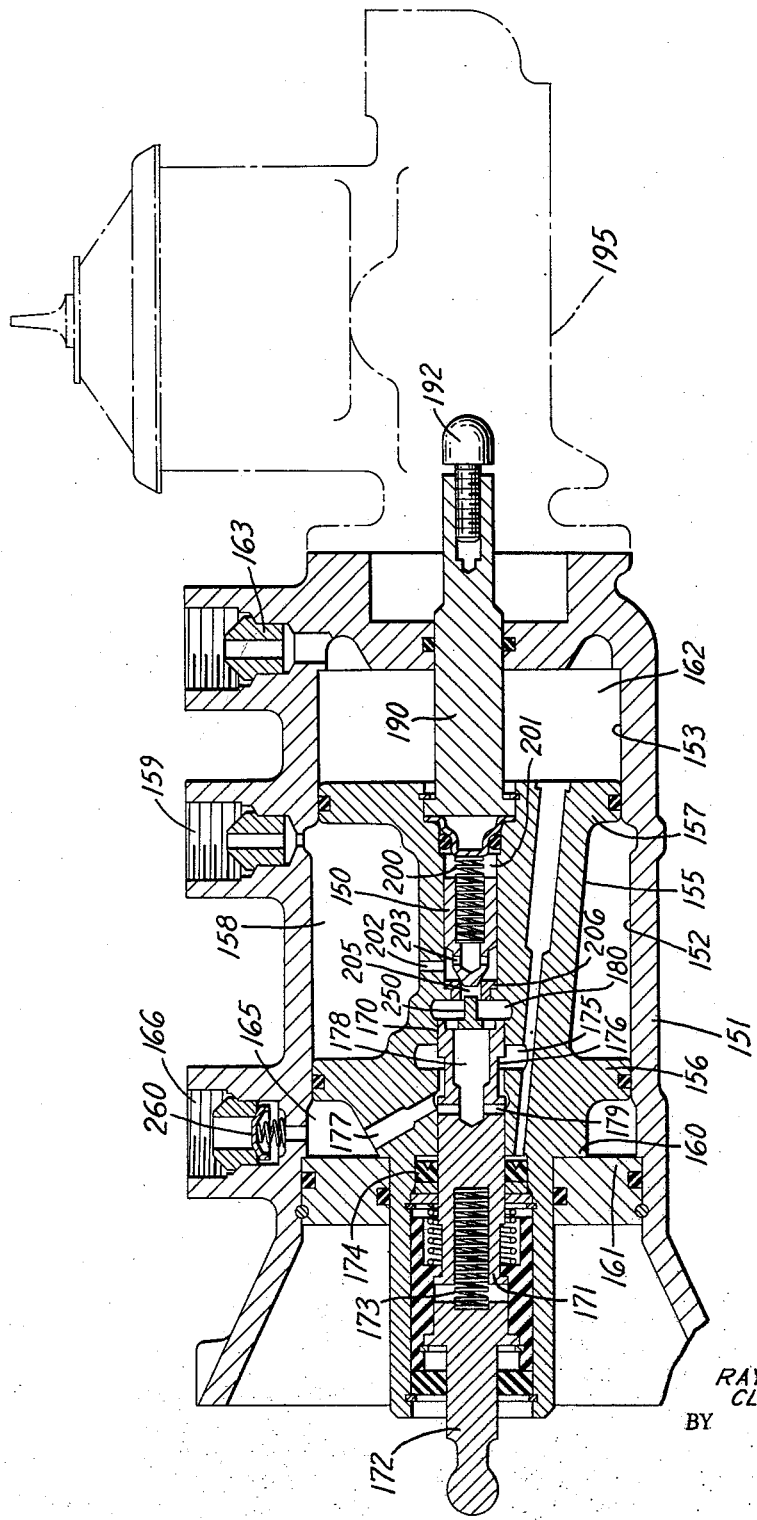

United States Patent Office 3,131,538
Patented May 5, 1964

3,131,538
HYDRAULIC POWER SYSTEM FOR BRAKES
Raymond J. Schultz, Bay City, and Claude A. Thorsby, Saginaw, Mich., assignors to General Motors Corporation, Detroit, Mich., a corporation of Delaware
Filed Apr. 30, 1962, Ser. No. 190,878
11 Claims. (Cl. 60—51)

This invention relates to a hydraulic power operating system for the brakes of a vehicle, the system being adapted to obtain hydraulic fluid under pressure from the hydraulic power steering system of the vehicle.

The power mechanism for the brakes of the vehicle may consist of a master cylinder comprising a fluid displacement member operating within a cylinder to effect displacement of hydraulic fluid under pressure into the wheel cylinders of hydraulically operated brakes, the fluid displacement member of the master cylinder being adapted for power actuation by a fluid motor that receives hydraulic fluid under pressure from a hydraulic pump that is adapted also to operate a hydraulically operated steering mechanism of the vehicle. The power mechanism for the brakes of the vehicle includes in the system a pressure accumulator that is adapted to be charged with fluid pressure during power actuation of the brakes so that the hydraulic fluid in the pressure accumulator is available for power operation of the fluid brakes in the event the hydraulic fluid pump, that normally supplies the power fluid, should be rendered inoperative.

In this invention the valve control mechanism that regulates the pressure applied to the power piston of the power mechanism for the brakes of the vehicle also regulates the flow of hydraulic fluid to the pressure accumulator so that the pressure accumulator will be charged at the same time the hydraulic brakes of the vehicle are applied.

It is also another object of the invention to provide a valve mechanism between the pressure accumulator and the power side of the power operated power mechanism for the brakes of the vehicle so that hydraulic fluid pressure can flow to the accumulator during the period of time the brakes of the vehicle are being applied, but which valve mechanism will prevent return flow of hydraulic fluid from the accumulator into the power side of the power operated brake mechanism until the valve mechanism is manually operated at a time when hydraulic fluid pressure is not available from the hydraulic fluid pump on the vehicle.

It is a still further object of the invention to provide a hydraulic power operated power mechanism for the brakes of the vehicle, the system of which includes an accumulator wherein a valve mechanism placed between the accumulator and the power side of the power mechanism for the brakes controls fluid flow to the accumulator from the power side of the power mechanism for the brakes during application of the brakes so that the maximum pressure utilized in applying the brakes will be that which is stored in the accumulator for use at a time when the hydraulic fluid pump should fail, the hydraulic fluid control valve being manually operated at this time to allow the accumulator pressure to be applied to the power side of the power mechanism for the brakes of the vehicle to apply the brakes by the stored accumulator pressure.

Further objects and advantages of the present invention will be apparent from the following description, reference being had to the accompanying drawings wherein preferred embodiments of the present invention are clearly shown.

In the drawings:
FIGURE 1 is a schematic illustration of a hydraulic power system for operation of the power brake mechanism of a vehicle utilizing hydraulic fluid power from the power steering system on the vehicle;

FIGURE 2 is a transverse cross-sectional view of a hydraulic fluid power mechanism for the brakes of a vehicle incorporating features of this invention; and FIGURE 3 is a transverse cross-sectional view of a modified arrangement of a mechanism for hydraulic power operation of brakes incorporating features of this invention.

In this invention the hydraulic power system consists of a hydraulic pump 10 that provides a source of hydraulic fluid under pressure for delivery through the line 11 to the steering control valve 12 of a vehicle. The pump 10 is adapted for belt drive through a pulley 13 to operate the hydraulic pump whenever the engine of the vehicle is operating. The pump 10 delivers hydraulic fluid under pressure into the discharge port 14 that includes a restricted passage 15 by which the maximum volume of fluid deliverable into the port 14 is controlled, dependent upon the pressure of the fluid in the pump discharge chamber 16. When the pump delivers hydraulic fluid at a flow rate above that capable of being carried by passage 15, excess fluid is discharged into the reservoir 17 through the by-pass control valve 18 which also maintains the pressure of the fluid in the discharge chamber 16 at a predetermined value.

Hydraulic fluid under pressure is delivered from the fluid pump through the conduit 11 to the inlet port 20 of the steering control valve 12 and is adapted to be circulated through the return line 21 through either or both of the conduits 22 or 23 depending upon the position of the control valve spool 24 located within the steering control valve 12.

As shown in FIGURE 1, fluid under pressure is being delivered into the cylinder 25 at the right-hand end of the power piston 26 through the conduit 27 by which the gear segment 28 is power driven in steering the vehicle. Concurrently, hydraulic fluid is being exhausted from the chamber 29 through the conduit 30 and into the line 22 for delivery into the return line 21. While the valve spool 24 is shown shifted in the left-hand position (FIGURE 1), it can be shifted in the right-hand position for oppositely connecting the chamber 29 and cylinder 25 for reverse power operation of the segment 28. The valve spool 24 is reciprocable in the body of the steering control member and normally is in a central position providing thereby what is known as an open center type valve.

Through a reaction mechanism 35 placed on the steering column 36 and a connecting mechanism 37 the spool 24 of the steering control valve is reciprocated depending upon the direction of rotation of the steering column 36 to effect axial reaction movement of the reaction mechanism 35 for shifting the control valve 24. Since steering control valves and fluid pumps of the general type disclosed are well known in the art, further detailed description thereof is believed unnecessary.

The return hydraulic fluid from the steering control valve 12 is by way of conduit 21 which in turn connects with the inlet port 40 of the hydraulic power mechanism 45 for operating the brakes of the vehicle. Normally the hydraulic power mechanism 45 allows free flow of hydraulic fluid from the inlet 40 to the outlet 41 in a manner hereinafter described so that the return conduit 42 can receive the hydraulic fluid that is returning from the steering control mechanism for delivery back into the reservoir 17.

When the hydraulic power mechanism 45 is operated for actuating the brakes of the vehicle, the flow of hydraulic fluid through the power mechanism 45 is retarded and pressure builds up in the power chamber 43 for operating the power piston 44 of the power unit 45 in a right-hand direction, in a manner hereinafter described.

If sufficient pressure builds up in the power chamber 43, the bypass relief valve 46 can open to allow excess fluid to be delivered into conduit 42 for return to the reservoir 17.

A master cylinder 50 is carried at one end of the hydraulic power mechanism 45 and receives a displacement plunger 51 which, upon movement in a right-hand direction, as viewed in FIGURES 1 and 2, causes displacement of hydraulic fluid from the master cylinder chamber 50 through the conduit 52 into the wheel cylinders 53 of the brake mechanism 54 at the wheels of the vehicle.

A brake pedal 55 operating through a linkage 56 actuates the control valve element 60 of the hydraulic power mechanism 45 in a manner more fully described hereinafter.

The hydraulic power mechanism 45 is connected with a pressure accumulator 61 that may be of any conventional type, but as illustrated in the drawing, consists of a piston 62 urged downwardly by gaseous pressure in the chamber 63 against the body of hydraulic fluid 64 in the accumulator for supply through the conduit 65 to an annular chamber 66 around the power piston 44.

As more particularly shown in FIGURE 2, the hydraulic power mechanism for operating the brakes of the vehicle comprises a body 70 having the cylinder 71 that receives the end portion 72 of the power piston 44 and a cylinder portion 73 that receives the end portion 74 of the power piston 44. It will be noted that the diameter of the cylinder portions 71 and 73 is a differential diameter, diameter 73 being larger than diameter 71, so that fluid under pressure standing in the accumulator 61 and connected with the chamber 66 through the inlet port 75 normally urges the power piston 44 in a left-hand direction to the position shown in FIGURE 2 which is also the retracted position of the brakes of the vehicle, thus placing the displacement plunger 51 in its extreme left-hand position of retraction out of the master cylinder 50. A shoulder 76 stops against the ring 77 at the left hand of the housing 70, seals 78 preventing loss of hydraulic fluid from the power chamber 43 around the cylindrical extension 79 at the left-hand end of the power piston 44.

The displacement plunger 51 operates in the master cylinder 50 through seal element 80 and 81 and within a seal member 82. The master cylinder 50 is connected with the reservoir chamber 83 through ports 84, 85, chamber 86 and port 87 when the displacement plunger is in the position shown in FIGURE 2. When the plunger moves forward and port 84 passes the lip of the seal 82 in a right-hand direction further connection with the reservoir chamber 83 is cut off and pressure is built up in chamber 50 for delivery to the brakes of the vehicle through the port 88 connected with port 89 by way of the residual pressure check valve 90. The inlet port 40 of the hydraulic power mechanism for the brakes is connected with the passage 95 provided in the housing 70 at one end of which it connects with the power chamber 43 and at the opposite end receives the relief pressure check valve 46 that is normally retained in the seated position shown in FIGURE 2 by means of the compression spring 96.

The control valve member 60 is slidable within the axial bore 100 in the power piston 44, the bore 100 also including the radially recessed chambers 101, 102, 103 and 104. Chamber 101 is connected with the power chamber 43 by the passage 105 and chamber 104 is connected with the power chamber 43 by the passage 106. Thus pressure building up in chamber 43 at any time is conducted to the annular recess chamber 104 around the control valve 60. Chamber 102 is connected with the annular chamber 66 around the power piston 44 by means of passage 107 and which conduits fluid under pressure to the chamber 66 and thereby to the accumulator 61 through the port 75 in a manner hereinafter described.

Power piston 44 carries the seals 108 and 109 at opposite ends.

With the control valve 60 in the position shown in FIGURE 2, the power chamber 43 receiving return fluid from the steering control 12 through the conduit 21 at inlet port 40 allows free flow of hydraulic fluid from the chamber 43 through the passage 105 and thence through axially extending recess passages 110 in the valve extension 111 into the central chamber 112 for delivery through the axial passage 113 into the passage 114 and thence into the radial passage 115 for delivery into the cylinder 71 so that the fluid can flow out the outlet passage 116 into the outlet port 41 for connection with the return conduit 42 for delivery of the hydraulic fluid to the reservoir 17.

It will thus be seen that when the hydraulic power mechanism 45 is in the position shown in FIGURE 2, there will be a relatively free flow of hydraulic fluid through the mechanism for return of fluid from the steering control valve to the reservoir 17. Normally the valve member 60 is retained in the position shown in FIGURE 2 by means of the spring 120, member 121 being provided with a suitable stop (not shown) to limit the left-hand movement of the valve member 60 to the position shown in FIGURE 2.

When valve member 60 is moved in a right-hand direction on movement of the brake pedal 55 downwardly, chamber 101 is gradually closed by the land area 125 on the valve member to thereby increase resistance to flow of hydraulic fluid through passage 105 that is returning through the passage 95. This causes a pressure build up in the power chamber 43 to drive the piston 44 in a right-hand direction. At the same time pressure is delivered from the power chamber 43 through passage 106 into annular chamber 104 so that as the valve member 60 moves in a right-hand direction, there is a leakage flow of hydraulic fluid around the valve portion 60a or by suitable passages provided between valve portion 60a and chambers 103 and 102 to allow for hydraulic fluid under pressure to be delivered from chamber 104 into chamber 102 and thereby into passage 107 for delivery to the chamber 66 and thereby to the accumulator 61 for storage in the accumulator. When the valve is in the position shown in FIGURE 2, the accumulator pressure is closed off from the power chamber 43 by the land area 130 around the valve portion 60a.

As the requirement for braking of the vehicle increases, the valve 60 is moved further forward in a right-hand direction so that there is a steady increase in pressure in power chamber 43 to meet the braking requirement to power drive the piston 44 in a right-hand direction with resultant increase of pressure through passage 106 and passage 107 into the accumulator so that the accumulator will receive the maximum value of fluid pressure that is built up in chamber 43.

Since the accumulator 61 is, in effect, isolated from the power chamber 43 when the power piston is in the left-hand position (as shown in FIGURE 2) should there be a failure of power pressure fluid resulting from failure of the pump 10, braking of the vehicle can still be obtained by the accumulator pressure stored in chamber 64.

This will be occasioned by movement of the control valve 60 in a right-hand direction, but since there is no power available for movement of the power piston 44 in a right-hand direction by the build up of pressure in the power chamber 43 from the pump 10, when valve member 60 moves in a right-hand direction there will be provided a reverse fluid flow connection provided from the accumulator 61 back through chamber 66 into passage 107 thence through the tortuous passage consisting of the chambers 103 and 104 with the power chamber 43 to effect power operation of the piston 44 in a right-hand direction. Check valve 330 prevents the pressure of the accumulator from passing back through the inlet line 21 to the power steering control valve mechanism 12.

When the fluid displacement member 51 moves into the master cylinder 50 and passage 84 moves to the right beyond the lip of the seal 82, fluid under pressure in the master cylinder 50 that is being delivered to the brakes of the vehicle also reacts on the piston element 230 to urge it in a left-hand direction against the plunger extension 131 to obtain "reaction feel" against the foot of the operator through the valve member 60 and back to the brake pedal. A seal 232 is provided around the member 130 to prevent loss of hydraulic fluid from the master cylinder 50.

In FIGURE 3 there is illustrated a modified arrangement of the hydraulic power mechanism for the brakes of the vehicle wherein a valve element 150 provides for complete disconnection of the accumulator from the power chamber of the hydraulic power mechanism until such time as the valve element is open mechanically as a result of power failure of the main hydraulic pump supplying hydraulic fluid under pressure to the power mechanism.

In the arrangement shown in FIGURE 3, the hydraulic power mechanism consists of a housing 151 having differential diameter cylinders 152 and 153 supporting the power piston member 155 which has piston portions 156 and 157 respectively operating in the cylinders 152 and 153. An annular chamber 158 is provided between the piston portions 156 and 157 which connects with an accumulator of the same general type heretofore described with reference to FIGURE 1 through the accumulator connection 159. Thus chamber 158 is always connected with the accumulator and because of the differential diameters of cylinders 152 and 153 normally urges the power piston 155 in a left-hand direction with the stop shoulder 160 thereof against the end ring or closure member 161. Cylinder 153 forms a chamber 162 that connects by a return port 163 with a return line to the reservoir of the hydraulic fluid pump, such as line 42 shown in FIGURE 1.

Fluid under pressure is supplied to the power chamber 165 through the inlet port 166 that is comparable to the inlet port 40 of the power mechanism shown in FIGURE 2 so that the return flow of hydraulic fluid from the steering control mechanism 12 is conducted through the power unit shown in FIGURE 3, in a manner hereinafter described.

The power piston 155 has an axial bore 170 in which there is positioned a control valve member 171 operated by a link member 172 that in turn is connected with the brake pedal of the vehicle. A compression spring 173 drivingly connects member 172 with the member 171 to allow for axial movement of member 171 relative to member 172 for reasons hereinafter described.

The seal member 174 is placed around the control valve 171 to prevent loss of hydraulic fluid.

The power piston 155 has a radial annular chamber 175 through which the right-hand end of the control valve 171 extends. The control valve 171 is provided with a reduced diameter recess portion 176 that cooperates with the annular portion 175 in the piston 155 to provide a fluid flow connection with the passage 177 that connects with the power chamber 165 of the power unit.

The control valve 171 also is provided with an axial bore 178 that connects by means of radial passage 179 with the chamber space 180 that communicates with the passage 177 so that fluid under pressure will be supplied to the bore 178 through passage 179 concurrently with a build up of pressure in the power chamber 165 in a manner hereinafter described.

The central bore 178 in the valve element 171 connects with the chamber 180 that provides a pressure reaction chamber when fluid under pressure is delivered into this chamber that reacts against the right-hand end of the member 171 to effect "brake feel" to the foot of the operator during a brake application. Also, this pressure in chamber 180 can react against the right-hand end of the member 171 to compress spring 173 when the pressure in the chamber 180 becomes excessive indicating excessive pressure in the power chamber 165 so as to necessitate pressure relief by movement of the member 171 in a left-hand direction to slightly reopen the passage 177 and prevent excess pressure building up in the chamber 165.

Power piston 155 has a forwardly extending member 190 that has an end portion 192 engageable with the piston of a master cylinder 195 to effect displacement of hydraulic fluid into the wheel cylinders of the brakes of the vehicle. Since this portion of the mechanism is well known in the art, it is not further disclosed or described.

Under normal conditions the power unit shown in FIGURE 3 is positioned as shown in this figure with the brakes in retracted position, the pressure in the accumulator retained in chamber 158 causing the power piston to be retained in the position shown. When the brake pedal of a vehicle is moved downwardly, member 172 and valve member 171 are moved forward in a right-hand direction as an integral unit, spring 173 having sufficient force effect to obtain this result. As valve member 171 moves in a right-hand direction, the passage 177 becomes restricted so that pressure builds up in chamber 165 by the restriction of return flow of fluid to the reservoir for the pump, in the manner heretofore described. As pressure builds up in chamber 165, the power piston 155 is moved in a right-hand direction to effect displacement of hydraulic fluid from the master cylinder 195. Also, when pressure builds up in chamber 165, the fluid pressure is conducted through the passage 179 to the axial bore 178 into chamber 180 so as to effect reaction force against the member 171 and thereby against the foot of the operator for "brake feel," the reaction effect being proportional to the pressure in chamber 180.

As pressure in chamber 180 is increased, it will gradually overcome the closed valve 150 being held closed by the compression spring 200 and the force effect of fluid under pressure in chamber 201 that comes from the accumulator chamber 158 through the ports 202 and 203. Thus, when the pressure in chamber 180 becomes greater than the total force effect of the pressure in chamber 158 and spring 200, valve 150 will open to allow pressure fluid to be delivered from the chamber 180 through the passage 205 in the valve seat 206 for delivery to the chamber 158 and thereby to the accumulator.

From the foregoing, it will be seen that the accumulator inlet port 159 and chamber 158 are in effect isolated from the power chamber 165 by the valve 150 until the pressure build up in chamber 165 is able to overcome the force effect of the accumulator pressure plus spring 200. Thus, the maximum pressure that will be built up in the accumulator will equal the maximum force effect applied to operate the vehicle brakes at any particular time, this maximum pressure being stored for use to effect a braking operation in the event of failure of the pump of the hydraulic fluid pressure system.

Should the pressure in chamber 180 become so excessive as to require relief, it will work against spring 173 to slightly open passage 177 and hold the pressure in chamber 180 at a relatively constant level.

In the event of failure of the hydraulic pump of the hydraulic pressure fluid system, valve member 171 is moved forward in the same manner as previously described, but under this condition the forward extending element 250 contacts the left-hand end of valve member 150 to mechanically open this valve and allow accumulator pressure that has been stored and held in chamber 158 to pass through passage 202 and port 205 back into the reaction chamber 180. From the reaction chamber the accumulator pressure will pass through the central bore 178 of valve member 171 and thence through the port 179 into port 177 to the power chamber 165 and thereby effect a right-hand power stroke of the power piston 155.

A check valve 260 is provided in the inlet port 166 to prevent this sudden surge of accumulator pressure from backing up through the conduit line 21 to affect the operation of the power steering control mechanism 12.

While the embodiments of the present invention as herein disclosed constitute preferred forms, it is to be understood that other forms might be adopted.

What is claimed is as follows:

1. In a hydraulic fluid power system for operating vehicle brakes, the combination of, a source of pressurized hydraulic fluid, a hydraulic fluid accumulator, a hydraulic fluid vehicle brake system including a master cylinder, a hydraulic fluid motor for assisting and pressurizing fluid in said master cylinder, manually operated control valve means controlling pressurization of hydraulic fluid in said motor and in said accumulator, said control valve means having one positioning of the valve mechanism providing for free flow of hydraulic fluid through said motor from said source and a second positioning of the valve mechanism restricting hydraulic fluid flow through said motor to induce thereby hydraulic fluid pressure build-up in said motor while concurrently directing said induced fluid pressure to said accumulator.

2. In a hydraulic fluid power system for operating vehicle brakes, the combination of, a source of pressurized hydraulic fluid, a hydraulic fluid accumulator, a hydraulic fluid vehicle brake system including a master cylinder, a hydraulic fluid motor for assisting and pressurizing fluid in said master cylinder, manually operated control valve means controlling pressurization of hydraulic fluid in said motor and in said accumulator, said control valve means having one positioning of the valve mechanism providing for free flow of hydraulic fluid through said motor from said source and a second positioning of the valve mechanism restricting hydraulic fluid flow through said motor to induce thereby hydraulic fluid pressure build-up in said motor while concurrently directing said induced fluid pressure to said accumulator, said valve mechanism retaining said induced fluid pressure in said accumulator during free flow of hydraulic fluid through said motor from said source.

3. In a hydraulic fluid power system for operating vehicle brakes, the combination of, a source of pressurized hydraulic fluid, a hydraulic fluid accumulator, a hydraulic fluid vehicle brake system including a master cylinder, a hydraulic fluid motor for assisting and pressurizing fluid in said master cylinder, manually operated control valve means controlling pressurization of hydraulic fluid in said motor and in said accumulator, said control valve means having one positioning of the valve mechanism providing for free flow of hydraulic fluid through said motor from said source and a second positioning of the valve mechanism restricting hydraulic fluid flow through said motor to induce thereby hydraulic fluid pressure build-up in said motor while concurrently directing said induced fluid pressure to said accumulator, said valve mechanism retaining said induced fluid pressure in said accumulator during free flow of hydraulic fluid through said motor from said source, said valve mechanism also providing for pressurized fluid flow from said accumulator to said motor with said valve mechanism in its said second position on failure of pressurized fluid delivery from said source.

4. In a hydraulic fluid power system for operating vehicle brakes, the combination of, a source of pressurized hydraulic fluid, a hydraulic fluid accumulator, a hydraulic fluid vehicle brake system including a master cylinder, a hydraulic fluid motor for assisting and pressurizing fluid in said master cylinder, manually operated control valve means controlling pressurization of hydraulic fluid in said motor and in said accumulator, said control valve means having one positioning of the valve mechanism providing for free flow of hydraulic fluid through said motor from said source and a second positioning of the valve mechanism restricting hydraulic fluid flow through said motor to induce thereby hydraulic fluid pressure build-up in said motor while concurrently directing said induced fluid pressure to said accumulator, said valve mechanism including a separately acting valve member controlling said induced fluid pressure flow to said accumulator.

5. In a hydraulic fluid power system for operating vehicle brakes, the combination of, a source of pressurized hydraulic fluid, a hydraulic fluid accumulator, a hydraulic fluid vehicle brake system including a master cylinder, a hydraulic fluid motor for assisting and pressurizing fluid in said master cylinder, manually operated control valve means controlling pressurization of hydraulic fluid in said motor and in said accumulator, said control valve means having one positioning of the valve mechanism providing for free flow of hydraulic fluid through said motor from said source and a second positioning of the valve mechanism restricting hydraulic fluid flow through said motor to induce thereby hydraulic fluid pressure build-up in said motor while concurrently directing said induced fluid pressure to said accumulator, said valve mechanism including a separately acting valve member controlling said induced fluid pressure flow to said accumulator and responsive to accumulator pressure to open when said induced fluid pressure is above the pressure valve in said accumulator.

6. In a hydraulc fluid power system for operating vehicle brakes, the combination of, a source of pressurized hydraulic fluid, a hydraulic fluid accumulator, a hydraulic fluid vehicle brake system including a master cylinder, a hydraulic fluid motor for assisting and pressurizing fluid in said master cylinder, manually operated control valve means controlling pressurization of hydraulic fluid in said motor and in said accumulator, said control valve means having one positioning of the valve mechanism providing for free flow of hydraulic fluid through said motor from said source and a second positioning of the valve mechanism restricting hydraulic fluid flow through said motor to induce thereby hydraulic fluid pressure build-up in said motor while concurrently directing said induced fluid pressure to said accumulator, said valve mechanism including a separately acting valve member controlling said induced fluid pressure to said accumulator and opened manually by said valve mechanism for pressurized fluid flow from said accumulator to said motor on failure of pressurized fluid delivery to said motor.

7. In a hydraulic power unit, the combination of, a housing forming a cylinder, a power piston in said cylinder having a reduced diameter portion between opposite ends cooperating with said cylinder to form an annular chamber around said piston, means forming a fluid flow port continuously in fluid connection with said annular chamber and adapted for connection with a fluid accumulator, means forming a fluid flow inlet port with first cylinder chamber means at one end of said piston, means forming a fluid flow outlet port with second cylinder chamber means at the opposite end of said piston, manually operated fluid flow control valve means in said piston, fluid flow passage means in said piston providing fluid connection between said first and second cylinder chamber means and regulated by said control valve means, additional passage means in said piston providing fluid connection between said first cylinder chamber means and said annular chamber and regulated by said control valve means, and fluid pressure actuated relief valve means providing fluid flow connection between the said inlet port and the said outlet port.

8. In a hydraulic power unit, the combination of, a housing forming a cylinder, a power piston in said cylinder having a reduced diameter portion between opposite ends cooperating with said cylinder to form an annular chamber around said piston, means forming a fluid flow port continuously in fluid connection with said annular chamber and adapted for connection with a fluid accumulator, means forming a fluid flow inlet port with first cylinder chamber means at one end of said piston, means forming a fluid flow outlet port with second cylinder chamber means at the opposite end of said piston, manually operated fluid flow control valve means in said piston, fluid flow passage means in said piston providing fluid connection between said first and second cylinder chamber means and regulated by said control valve means, additional passage means in said piston providing fluid connection between said first cylinder chamber means and said annular chamber and regulated by said control valve means, said control valve means comprising slide valve means which opens the said additional passage means in said piston to provide fluid connection between the said first cylinder chamber means and the said annular chamber concurrently with closing off of the said fluid flow passage means between the said first and second cylinder chamber means effecting thereby build-up of fluid pressure in the said first cylinder chamber means to effect power movement of the said power piston and supply the said build-up of fluid pressure to the said annular chamber around the power piston for supply to an accumulator connected therewith.

9. In a hydraulic power unit, the combination of, a housing forming a cylinder, a power piston in said cylinder having a reduced diameter portion between opposite ends cooperating with said cylinder to form an annular chamber around said piston, means forming a fluid flow port continuously in fluid connection with said annular chamber and adapted for connection with a fluid accumulator, means forming a fluid flow inlet port with first cylinder chamber means at one end of said piston, means forming a fluid flow outlet port with second cylinder chamber means at the opposite end of said piston, manually operated fluid flow control valve means in said piston, fluid flow passage means in said piston providing fluid connection between said first and second cylinder chamber means and regulated by said control valve means, additional passage means in said piston providing fluid connection between said first cylinder chamber means and said annular chamber and regulated by said control valve means, and other fluid flow control valve means in said piston responsive to fluid pressure in said annular chamber to additionally regulate fluid flow between said first cylinder chamber means and said annular chamber when fluid pressure in said first cylinder chamber means is above the fluid pressure in said annular chamber.

10. In a hydraulic fluid power unit, the combination of, a housing forming a cylinder, a power piston in said cylinder having a reduced diameter portion between opposite ends cooperating with said cylinder to form an annular chamber around said piston, means forming a fluid flow port continuously in fluid connection with said annular chamber and adapted for connection with a hydraulic fluid accumulator, means forming a fluid flow inlet port with first cylinder chamber means at one end of said piston, means forming a fluid flow outlet port with second cylinder chamber means at the opposite end of said piston, manually operated fluid flow control valve means in said piston comprising a slide valve, fluid flow passage means in said piston providing fluid connection between said first and second cylinder chamber means regulated by axial movement of said slide valve means, additional passage means in said piston providing fluid connection between said first cylinder chamber means and said annular chamber, and additional valve means in said additional passage means responsive to fluid pressure in said annular chamber controlling fluid pressure flow from said first cylinder chamber to said annular chamber.

11. In a hydraulic fluid power unit, the combination of, a housing forming a cylinder, a power piston in said cylinder having a reduced diameter portion between opposite ends cooperating with said cylinder to form an annular chamber around said piston, means forming a fluid flow port continuously in fluid connection with said annular chamber and adapted for connection with a hydraulic fluid accumulator, means forming a fluid flow inlet port with first cylinder chamber means at one end of said piston, means forming a fluid flow outlet port with second cylinder chamber means at the opposite end of said piston, manually operated fluid flow control valve means in said piston comprising a slide valve, fluid flow passage means in said piston providing fluid connection between said first and second cylinder chamber means regulated by axial movement of said slide valve means, additional passage means in said piston providing fluid connection between said first cylinder chamber means and said annular chamber, additional valve means in said additional passage means responsive to fluid pressure in said annular chamber controlling fluid pressure flow from said first cylinder chamber to said annular chamber, and means on said slide valve means engageable with said additional valve means to open the same on axial movement of the said slide valve means and failure of fluid pressure to build up in said first cylinder chamber means during the said operation of said slide valve means.

References Cited in the file of this patent

UNITED STATES PATENTS

| | | |
|---|---|---|
| 2,902,829 | Verbrugge | Sept. 8, 1959 |
| 2,956,405 | Spalding et al. | Oct. 18, 1960 |
| 3,016,710 | Kurz et al. | Jan. 16, 1962 |